US010164781B2

(12) United States Patent
Hong

(10) Patent No.: US 10,164,781 B2
(45) Date of Patent: Dec. 25, 2018

(54) METHOD AND APPARATUS FOR DYNAMIC POLICY INTERWORKING BETWEEN PCFR AND NAT

(71) Applicant: Samsung Electronics Co., Ltd., Gyeonggi-do (KR)

(72) Inventor: Jin-Woo Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 14/367,207

(22) PCT Filed: Dec. 12, 2012

(86) PCT No.: PCT/KR2012/010766
§ 371 (c)(1),
(2) Date: Jun. 19, 2014

(87) PCT Pub. No.: WO2013/094920
PCT Pub. Date: Jun. 27, 2013

(65) Prior Publication Data
US 2014/0325091 A1 Oct. 30, 2014

(30) Foreign Application Priority Data
Dec. 19, 2011 (KR) ........................ 10-2011-0137560

(51) Int. Cl.
*H04L 12/14* (2006.01)
*H04M 15/00* (2006.01)
(Continued)

(52) U.S. Cl.
CPC .......... *H04L 12/1407* (2013.01); *H04L 61/25* (2013.01); *H04L 61/2557* (2013.01);
(Continued)

(58) Field of Classification Search
CPC ..... H04L 61/25; H04L 12/1407; H04M 15/66
(Continued)

(56) References Cited

U.S. PATENT DOCUMENTS 7,181,535 B1 * 2/2007 Remael .................. H04L 29/06
709/242
2004/0148375 A1 * 7/2004 Levett ...................... G06F 9/46
709/223
(Continued)

FOREIGN PATENT DOCUMENTS

KR 10-2010-0020522 2/2010
KR 10-2010-0116196 10/2010
(Continued)

OTHER PUBLICATIONS

International Search Report dated Mar. 29, 2013 in connection with International Patent Application No. PCT/KR2012/010766, 3 pages.
(Continued)

*Primary Examiner* — Kevin T Bates
*Assistant Examiner* — Chen-Liang Huang

(57) ABSTRACT

Interworking between a policy decision device and an address translation device is provided. An operation method of the policy decision device in a mobile communication system includes, if receiving address translation information about a user equipment, determining translated address information about the user equipment using the address translation information, if receiving a service information request for the user equipment, distinguishing the user equipment using address information included in the service information request and the translated address information, and sending a response to the service information request.

12 Claims, 8 Drawing Sheets

(51) Int. Cl.
*H04L 29/08* (2006.01)
*H04L 29/12* (2006.01)
*H04L 29/06* (2006.01)
*H04W 8/26* (2009.01)

(52) U.S. Cl.
CPC .............. *H04L 67/14* (2013.01); *H04L 69/08* (2013.01); *H04M 15/66* (2013.01); *H04W 8/26* (2013.01); *H04L 61/2514* (2013.01)

(58) Field of Classification Search
USPC .......................................................... 709/245
See application file for complete search history.

(56) References Cited

U.S. PATENT DOCUMENTS

| | | | | |
|---|---|---|---|---|
| 2005/0165963 A1* | 7/2005 | Satzke | .............. | H04L 29/12009 709/245 |
| 2006/0146870 A1* | 7/2006 | Harvey | .............. | H04L 29/12009 370/466 |
| 2007/0060276 A1* | 3/2007 | Monahan | ................ | G06Q 30/02 463/17 |
| 2007/0189329 A1* | 8/2007 | Latvala | ............. | H04L 29/12358 370/466 |
| 2007/0288469 A1* | 12/2007 | Shenfield | ................ | H04L 67/26 |
| 2008/0117855 A1* | 5/2008 | Choi | ........................ | H04W 8/30 370/315 |
| 2009/0076912 A1* | 3/2009 | Rajan | ..................... | G06Q 30/02 705/14.64 |
| 2009/0077239 A1* | 3/2009 | Kaneko | ................... | H04L 41/06 709/227 |
| 2009/0207757 A1 | 8/2009 | Andreasen et al. | | |
| 2010/0122183 A1* | 5/2010 | Babaian | ................. | H04W 4/02 715/752 |
| 2010/0161722 A1* | 6/2010 | Jeon | ..................... | G06Q 10/107 709/203 |
| 2011/0103266 A1 | 5/2011 | Andreasen et al. | | |
| 2012/0320801 A1* | 12/2012 | Yang | ...................... | H04L 12/14 370/259 |
| 2014/0095686 A1* | 4/2014 | Zhou | ................... | H04L 61/2503 709/223 |
| 2014/0269740 A1* | 9/2014 | Garneij | ................... | H04W 8/26 370/401 |

FOREIGN PATENT DOCUMENTS

| | | |
|---|---|---|
| KR | 10-2011-0069640 | 6/2011 |
| KR | 10-1067357 | 9/2011 |
| WO | WO 2011144083 A2 * | 11/2011 ......... H04L 61/2503 |

OTHER PUBLICATIONS

Written Opinion of International Searching Authority dated Mar. 29, 2013 in connection with International Patent Application No. PCT/KR2012/010766, 5 pages.

* cited by examiner

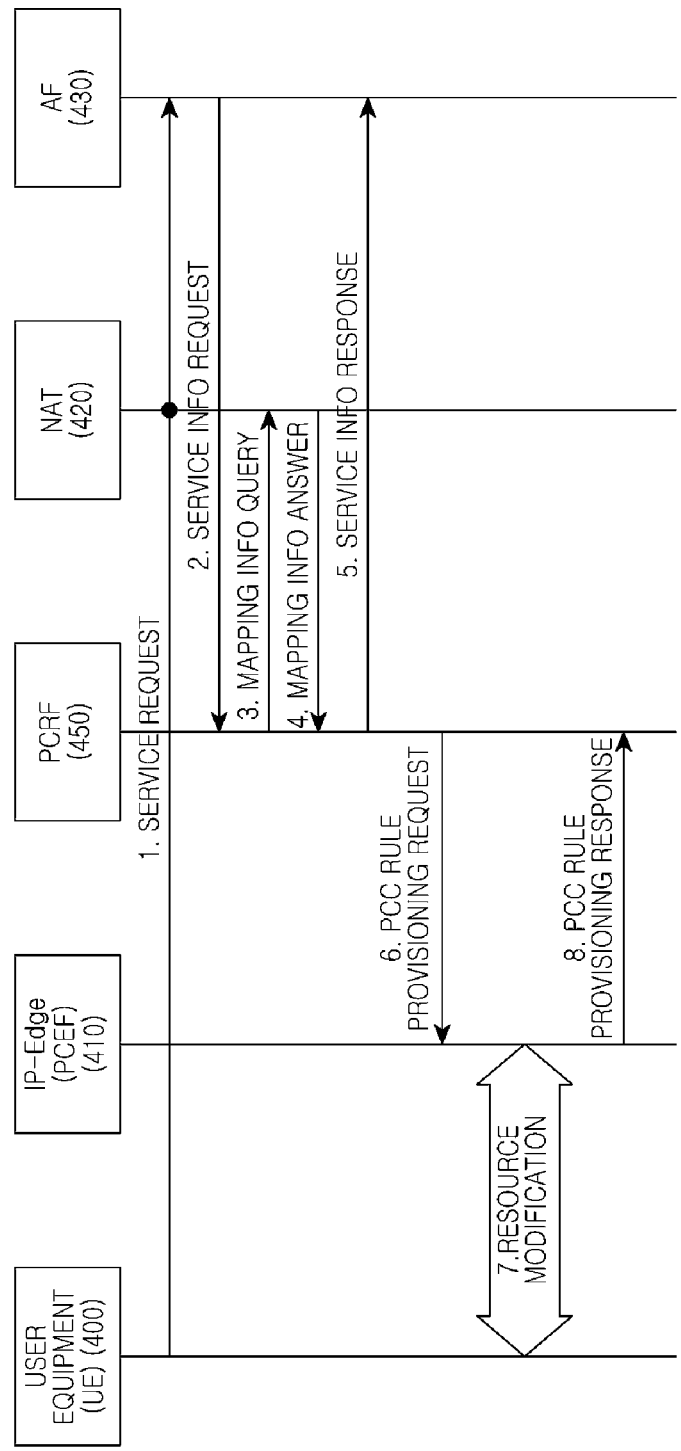
[Fig. 4]

[Fig. 5]
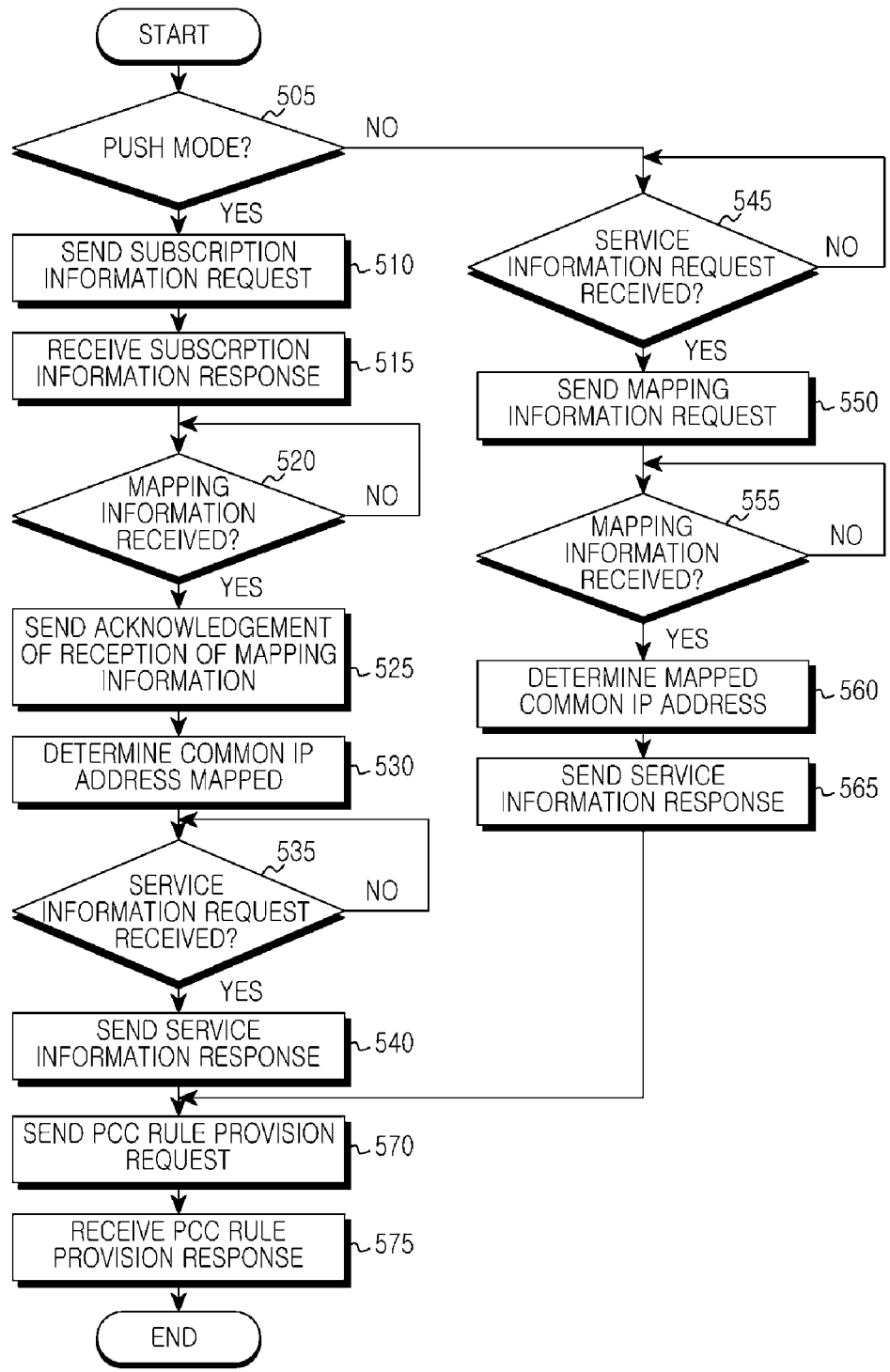

[Fig. 6]
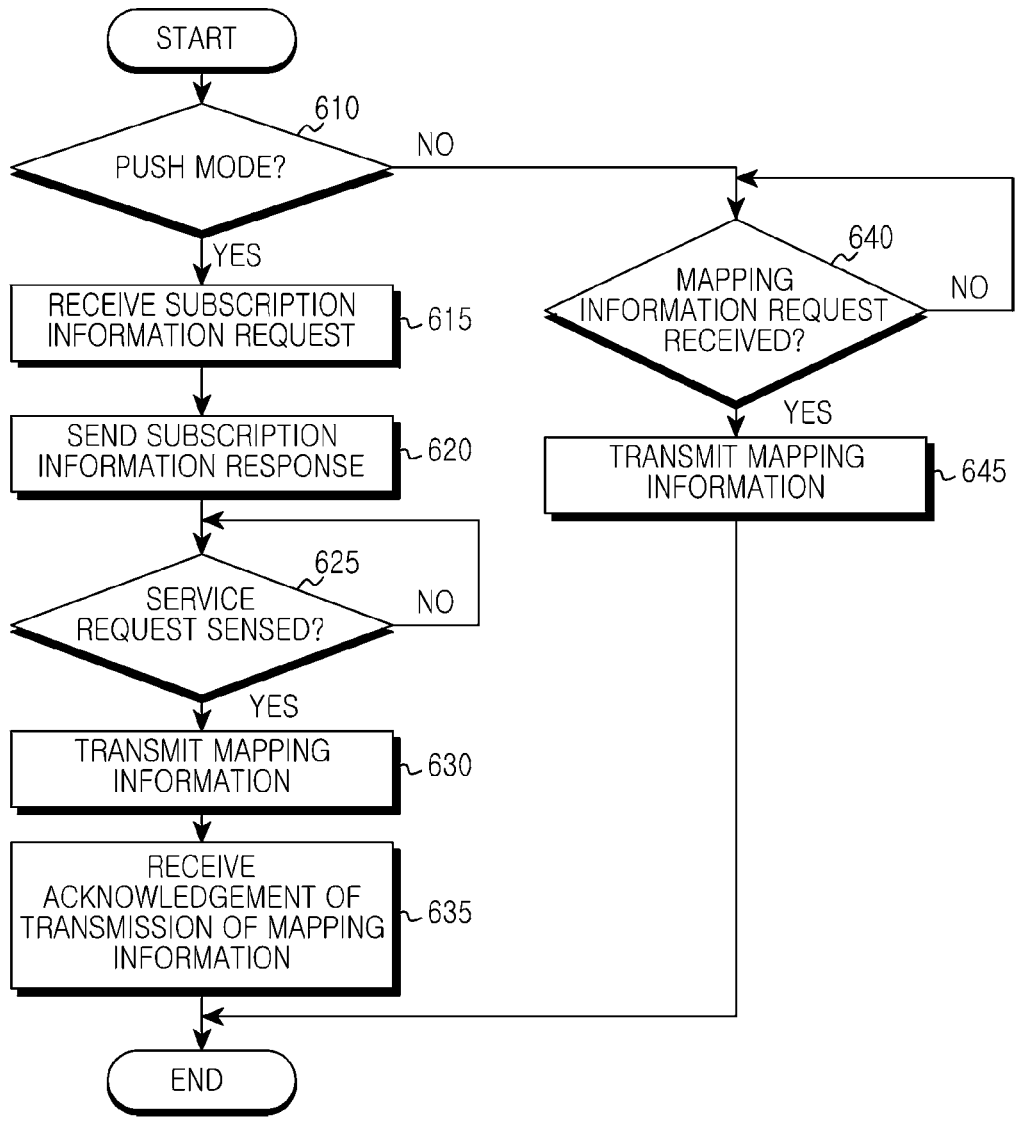

[Fig. 7]
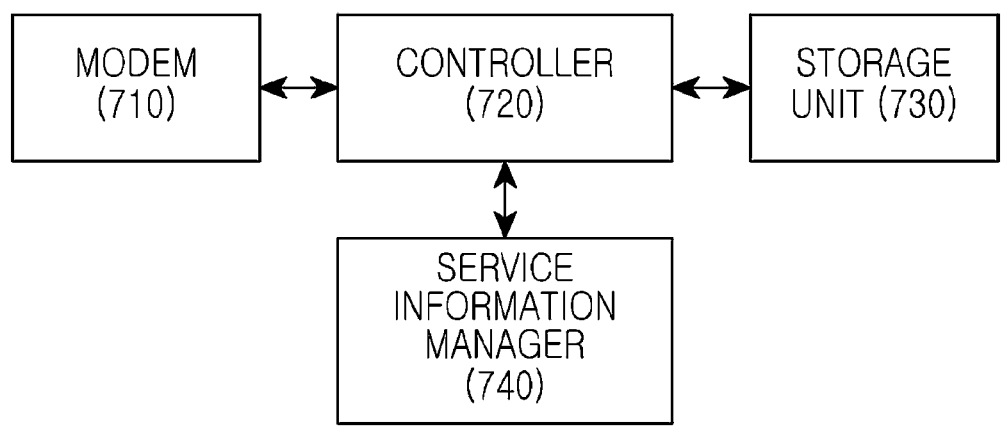

[Fig. 8]
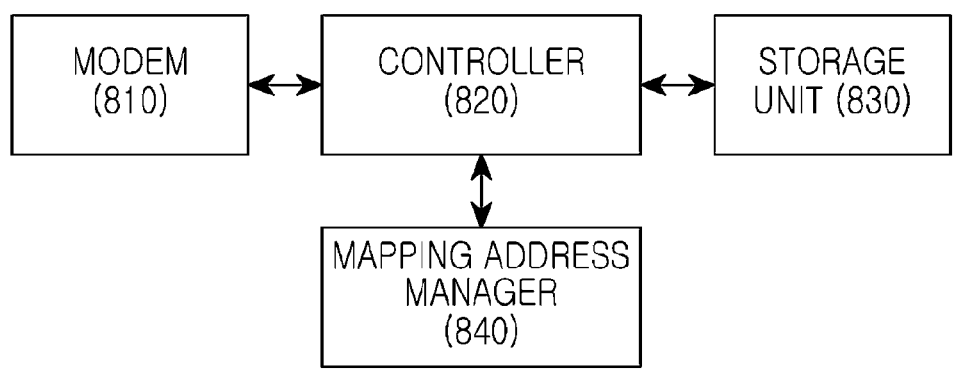

METHOD AND APPARATUS FOR DYNAMIC POLICY INTERWORKING BETWEEN PCFR AND NAT

TECHNICAL FIELD

The present invention relates to a method and apparatus for making dynamic resource allocation possible by achieving normal policy decision even when an Internet Protocol (IP) address allocated to a user terminal is translated by an address translation device in a network to which a dynamic resource allocation mechanism is applied.

BACKGROUND ART

A Policy and Charging Rules Function (PCRF) provides a differentiated policy by subscriber to a Policy and Charging Enforcement Function (PCEF) of an IP-Edge of an access network, such as a Packet Data Network-GateWay (PDN-GW) of a Long Term Evolution (LTE) network, a Gateway GPRS Support Node (GGSN) of a High Speed Packet Access (HSPA) network, a Packet Data Serving Node (PDSN) of a Code Division Multiple Access (CDMA) network, an Access Service Network-GateWay (ASN-GW) of a mobile Worldwide Interoperability for Microwave Access (WiMAX) network, and an evolved Packet Data Gateway (ePDG) of an Interworking-Wireless Local Area Network (I-WLAN) network.

The PCRF is a device for generating a differentiated policy by subscriber. The PCRF receives Quality of Service (QoS) and billing information of a subscriber from a Subscription Profile Repository (SPR), and receives access network information from the PCEF.

The PCRF performs dynamic resource allocation based on real-time service information. For the sake of this, the PCRF receives dynamic service information from an Application Function (AF). The IP-Edge (or PCEF) transmits IP address information, which is allocated to a user terminal in the IP-Edge, together with a terminal IDentifier (ID) from the PCRF at an IP-Connectivity Access Network (IP-CAN) session generation time point. And, if receiving a service request from the user terminal, the AF makes a request which includes an IP address of the user terminal for resources necessary for service provision.

The PCRF identifies the user terminal using the IP address of the user terminal included in the service request received from the AF, determines a policy based on subscription information of the user terminal, and forwards the determined policy to the IP-Edge.

If the IP address allocated in the IP-Edge is an Internet Protocol version 4 (IPv4) address, the IP-Edge allocates a private IPv4 address instead of allocating a public IPv4 address directly to the user terminal due to an IP address exhaustion problem and a security problem. In this case, the translation of a private IP address into a public IP address is implemented through a Network Address Translation (NAT) in order to receive the provision of service from a server of an external network.

Particularly, when a network provider and a service provider are separated like a Sponsored Data Connectivity architecture defined in the 3rd Generation Partnership Project Policy and Charging Control (3GPP PCC) Release (Rel.) 10, a private IP address is allocated to a user terminal by the IP-Edge of the network provider and, for the sake of service provider's AF interworking, the private IP address is translated into a public IP address by the NAT.

However, when an IP address of the user terminal is translated by the NAT, because the AF cannot know the IP address before address translation, dynamic service information forwarded by the AF to the PCRF is based on an IP address after the address translation. In this case, because the PCRF provides a service based on IP address information of the user terminal forwarded from the IP-Edge, there is a problem that the PCRF cannot process the dynamic service information forwarded by the AF.

DISCLOSURE OF INVENTION

Solution to Problem

An aspect of the present invention is to substantially solve at least the above problems and/or disadvantages and to provide at least the advantages below. Accordingly, one aspect of the present invention is to provide a method and apparatus for dynamic policy interworking between a policy decision device and an address translation device.

Another aspect of the present invention is to provide a method and apparatus for providing a method in which a Policy and Charging Rules Function (PCRF) uses Internet Protocol (IP) address information allocated by a Network Address Translation (NAT), through direct interworking between the PCRF and the NAT.

A further aspect of the present invention is to provide a method and apparatus for, even when a NAT exists, making possible provision of a policy for a dynamic service through direct interworking between a PCRF and the NAT.

The above aspects are achieved by providing a method and apparatus for dynamic policy interworking between a PCRF and a NAT.

According to one aspect of the present invention, an operation method of a policy decision device in a mobile communication system is provided. The method includes, if receiving address translation information about a user equipment, determining translated address information about the user equipment using the address translation information, if receiving a service information request for the user equipment, distinguishing the user equipment using address information included in the service information request and the translated address information, and sending a response to the service information request.

According to another aspect of the present invention, an operation method of an address translation device in a mobile communication system is provided. The method includes, if detecting a service information request from a user equipment, determining address translation for the user equipment, and transmitting address translation information about the user equipment.

According to a further aspect of the present invention, a policy decision device in a mobile communication system is provided. The device includes a modulator/demodulator (modem) and a controller. The modem communicates with other devices. If receiving address translation information about a user equipment, the controller determines translated address information about the user equipment using the address translation information and, if receiving a service information request for the user equipment, distinguishes the user equipment using address information included in the service information request and the translated address information, and sends a response to the service information request.

According to yet another aspect of the present invention, an address translation device in a mobile communication system is provided. The device includes a modem and a controller. The modem communicates with other devices. If detecting a service information request from a user equipment, the controller determines address translation for the user equipment, and transmits address translation information about the user equipment.

BRIEF DESCRIPTION OF DRAWINGS

The above and other objects, features and advantages of the present invention will become more apparent from the following detailed description when taken in conjunction with the accompanying drawings in which:

FIG. 4 is a ladder diagram illustrating a dynamic resource allocation process at PULL scheme use according to an exemplary embodiment of the present invention;

FIG. 5 is a flowchart illustrating an operation process of a Policy and Charging Rules Function (PCRF) according to an exemplary embodiment of the present invention;

FIG. 6 is a flowchart illustrating an operation process of a Network Address Translation (NAT) according to an exemplary embodiment of the present invention;

FIG. 7 is a block diagram illustrating a construction of a PCRF according to an exemplary embodiment of the present invention; and FIG. 8 is a block diagram illustrating a construction of a NAT according to an exemplary embodiment of the present invention.

BEST MODE FOR CARRYING OUT THE INVENTION

Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification.

A method and apparatus for dynamic policy interworking between a policy decision device and an address translation device according to the present invention are described below.

Figure 1:
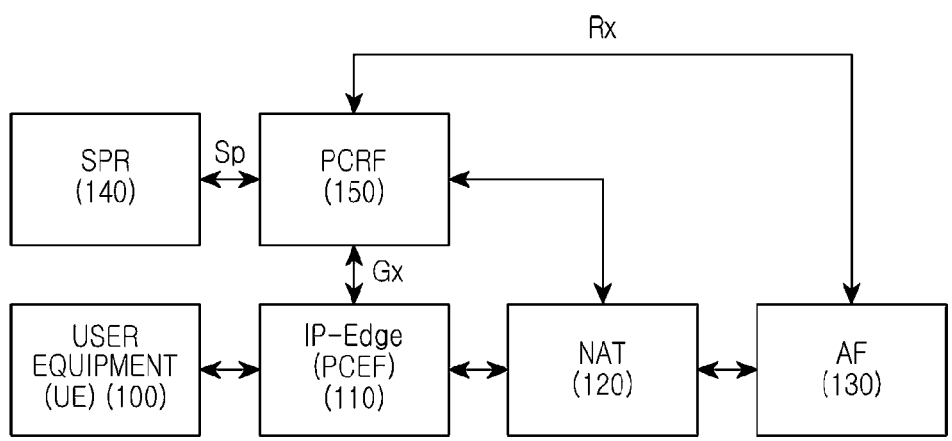
FIG. 1 is a diagram illustrating a network structure according to an exemplary embodiment of the present invention.

FIG. 1 is a diagram illustrating a network structure according to an exemplary embodiment of the present invention.

Referring to FIG. 1, a Policy and Charging Control (PCC) network structure is illustrated including interworking between a Policy and Charging Rules Function (PCRF) and a Network Address Translation (NAT). The PCC network includes a User Equipment (UE) 100, a Policy and Charging Enforcement Function (PCEF) (or Internet Protocol-Edge (IP-Edge)) 110, the NAT 120, an Application Function (AF) 130, a Subscription Profile Repository (SPR) 140, and the PCRF 150.

Here, an interworking interface between the PCRF 150 and the NAT 120 is an interface newly defined in the present invention. For this, the PCRF 150 and the NAT 120 require a function change for new interface support and interworking.

The NAT 120 provides a function of translating a private IP address of the UE 100 into a public IP address of the UE 100 and also, forwards translation mapping in formation between the private IP address and the public IP address, to the PCRF 150. Also, the NAT 120 provides a function of translating a public IP address of the UE 100 into representative another public IP address of the network and also, forwards translation mapping information between the public IP address and the another public IP address, to the PCRF 150.

As a scheme of forwarding IP address translation mapping information to the PCRF 150, there are a PUSH scheme and a PULL scheme. The PUSH scheme is a scheme in which the moment the NAT 120 generates IP address translation mapping information, the NAT 120 forwards the IP address translation mapping information to the PCRF 150. The PULL scheme is a scheme in which the PCRF 150 queries the NAT 120 about IP address translation mapping information.

The present invention can use IP address/port information allocated by the NAT 120, as information for determining a dynamic policy in the PCRF 150. For the sake of this, the present invention is composed of a translation mapping management procedure of an IP address/port allocation time point and a procedure of forwarding IP address/port information. In the present invention, the PCRF 150 can be called a policy decision device, and the NAT 120 can be called an address translation device, and the AF 130 can be called an application.

Figure 2:
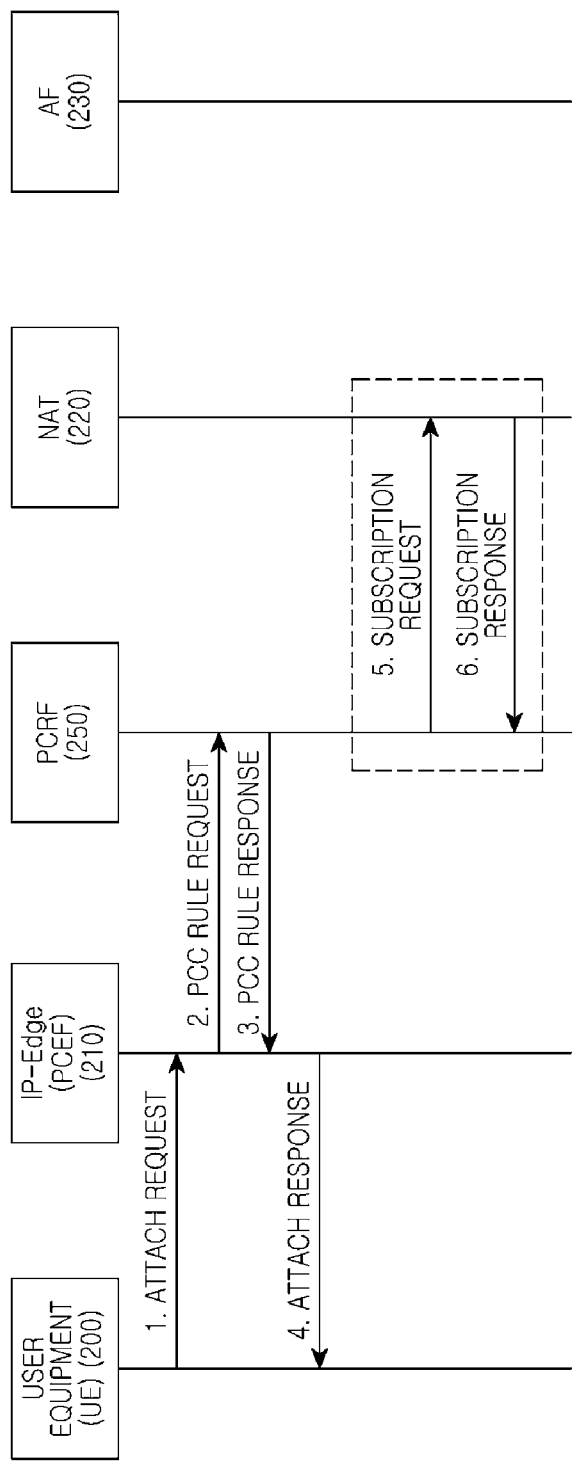
FIG. 2 is a ladder diagram illustrating a procedure of an Internet Protocol-Connectivity Access Network (IP-CAN) session generation time point according to an exemplary embodiment of the present invention.

FIG. 2 is a ladder diagram illustrating a procedure of an IP-Connectivity Access Network (IP-CAN) session generation time point according to an exemplary embodiment of the present invention.

Referring to FIG. 2, in step 1, a UE 200 sends an IP-CAN session generation request to an IP-Edge 210. After that, the IP-Edge 210 proceeds to step 2 and allocates an IP address to the UE 200, includes a terminal IDentifier (ID) and the allocated IP address in a Policy and Charging Control (PCC) rule request for the UE 200, and sends the PCC rule request to a PCRF 250.

After that, in step 3, the PCRF 250 determines a policy to apply to the UE 200 and sends a PCC rule response including the determined policy to the IP-Edge 210. For the sake of this, SPR interworking can be needed.

Next, in step 4, the IP-Edge 210 sends an IP-CAN session generation completion response to the UE 200, and applies a PCC rule received from the PCRF 250, to a corresponding IP-CAN session. In this case, the IP address allocated by the IP-Edge 210 can be forwarded to the UE 200.

After that, if the IP address allocated to the UE 200 by the IP-Edge 210 is a private IP address, the PCRF 250 proceeds to step 5 and selectively sends the NAT 220 a subscription request for forwarding public IP address/port information allocated for packets of the corresponding IP address to the PCRF 250.

Next, the NAT 220 receiving the subscription request from the PCRF 250 proceeds to step 6 and sends a subscription response of informing a success of the subscription request, to the PCRF 250.

Steps 5 and 6 may be omitted in a PULL scheme in which the PCRF 250 queries the NAT 220 about IP address/port translation mapping.

Figure 3:
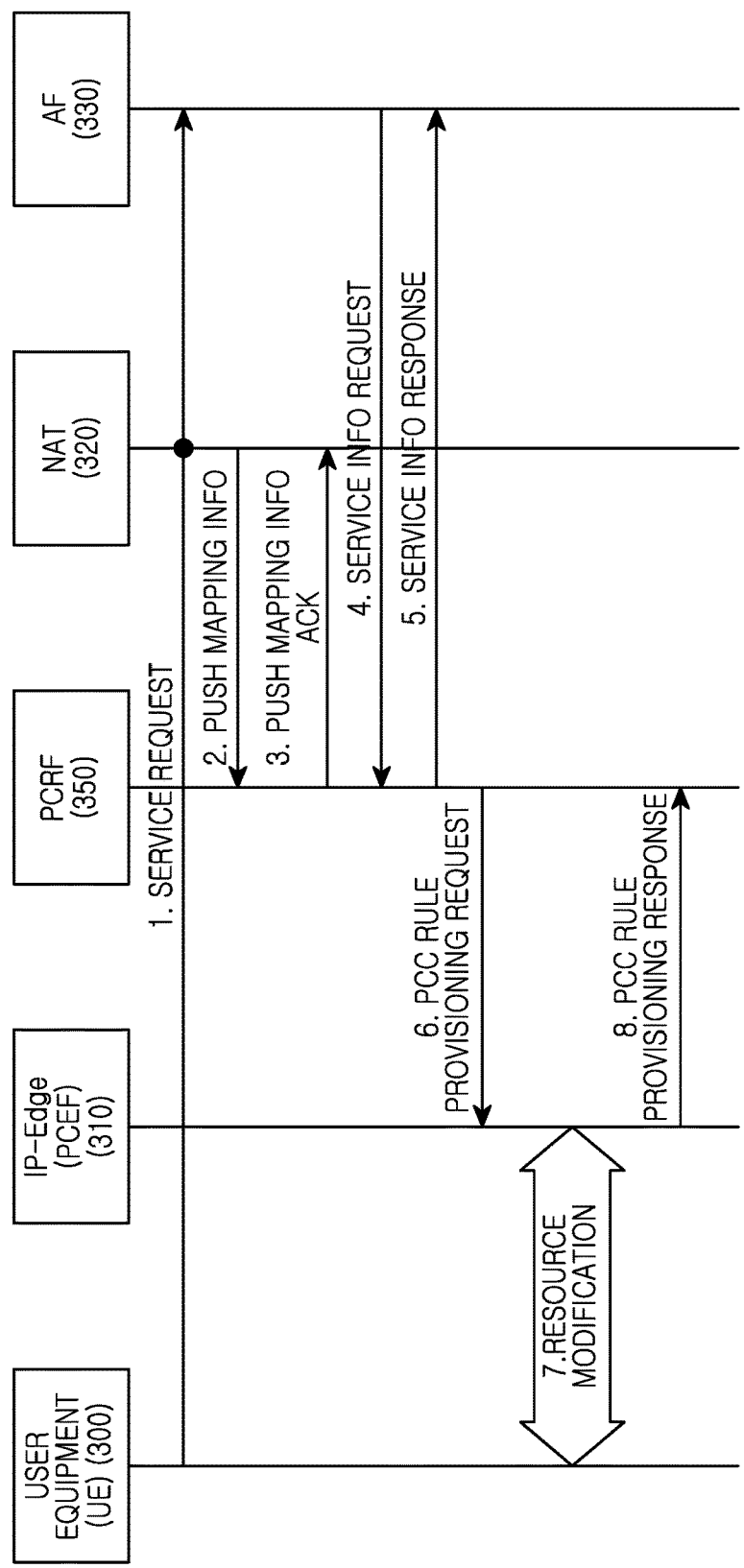
FIG. 3 is a ladder diagram illustrating a dynamic resource allocation process at PUSH scheme use according to an exemplary embodiment of the present invention.

FIG. 3 is a ladder diagram illustrating a dynamic resource allocation process at PUSH scheme use according to an exemplary embodiment of the present invention.

Referring to FIG. 3, in step 1, a UE 300 sends a service request to an AF 330. In this case, packets transmitted by the UE 300 can be forwarded to an IP-Edge 310 through a tunnel between the UE 300 and the IP-Edge 310. For the packets going through the IP-Edge 310, a NAT 320 translates a private IP address allocated by the IP-Edge 310 into a public IP address, and forwards the public IP address to the AF 330. In an exemplary embodiment, when NAT-Port Translation (NAT-PT) is used, the NAT 320 may change port information designated by the UE 300.

After that, if the private IP address allocated to the UE 300 is an address for which the PCRF 350 has made subscription request, the NAT 320 proceeds to step 2 and forwards IP address translation mapping information between the private IP address and the public IP address or a previous port and a translated port, to the PCRF 350. Next, the PCRF 350 proceeds to step 3 and sends the NAT 320 an ACKnowledgement (ACK) of acknowledging that the PCRF 350 has normally received the IP address translation mapping information from the NAT 320.

Next, in order to process the service request from the UE 300, the AF 330 proceeds to step 4 and sends a service information request including Quality of Service (QoS) information about the UE 300, to the PCRF 350. The service information request includes the public IP address into which the NAT 320 translates the private IP address of the UE 300.

After that, the PCRF 350 proceeds to step 5 and sends the AF 330 a service information response to the service information request using the IP address translation mapping information received from the NAT 320.

The service information response to the service information request can include the acceptance or non-acceptance of the QoS information and the like.

Next, the PCRF 350 proceeds to step 6 and identifies the UE 300 corresponding to the public IP address received from the AF 330, using the IP address translation mapping information received from the NAT 320, to determine a policy to apply to the identified UE 300, and generates a PCC rule to send a PCC rule provision request including the PCC rule to the IP-Edge 310.

After that, the IP-Edge 310 proceeds to step 7 and performs resource subscription with the UE 300 based on the PCC rule. Next, in step 8, the IP-Edge 310 sends a PCC rule provision response representing that the resource subscription has been completed, to the PCRF 350.

Here, if it is a PUSH scheme, when IP address information allocated to the UE 300 is released, the NAT 320 sends a notification of release of the IP address information to the PCRF 350, and the PCRF 350 deletes the IP address information and then sends a deletion response to the NAT 320.

FIG. 4 is a ladder diagram illustrating a dynamic resource allocation process at PULL scheme use according to an exemplary embodiment of the present invention.

Referring to FIG. 4, in step 1, a UE 400 sends a service request to an AF 430. In this case, packets transmitted by the UE 400 can be forwarded to an IP-Edge 410 through a tunnel between the UE 400 and the IP-Edge 410. And then, for the packets going through the IP-Edge 410, a NAT 420 translates a private IP address allocated by the IP-Edge 410 into a public IP address, and forwards the public IP address to the AF 430. In an exemplary embodiment, if NAT-PT is used, the NAT 420 may change port information designated by the UE 400.

Next, in order to process the service request from the UE 400, the AF 430 proceeds to step 2 and sends a service information request including required QoS information to the PCRF 450. The service information request includes the public IP address into which the NAT 420 translates the private IP address of the UE 400.

Next, the PCRF 450 proceeds to step 3 and sends the NAT 430 a request for IP address translation mapping information between the private IP address and the public IP address or a previous port and a translated port, because the PCRF 450 cannot find the UE 400 corresponding to the public IP address included in the service information request received from the AF 430.

After that, in response to the IP address translation mapping information request of the PCRF 450, the NAT 420 proceeds to step 4 and sends an IP address translation mapping information response to the PCRF 450.

Next, in step 5, the PCRF 450 sends a service information response to the service information request, to the AF 430. The service information response to the service information request includes the required QoS information about the UE 400.

Next, in step 6, the PCRF 450 identifies the UE 400 corresponding to the public IP address received from the AF 430, using the IP address translation mapping information received from the NAT 420, to determine a policy to apply to the identified UE 400, and generates a PCC rule to send a PCC rule provision request including the PCC rule to the IP-Edge 410.

After that, the IP-Edge 410 proceeds to step 7 and performs resource subscription with the UE 400 based on the PCC rule. Next, in step 8, the IP-Edge 410 sends the PCRF 450 a PCC rule provision response representing that the resource subscription has been completed.

FIG. 5 is a flowchart illustrating an operation process of a PCRF according to an exemplary embodiment of the present invention.

Referring to FIG. 5, if it is a PUSH mode in step 505, the PCRF proceeds to step 510 and sends a subscription information request to a NAT. The subscription information request represents that, if an IP address allocated to a UE is a private IP address, the PCRF sends the NAT a subscription request for forwarding public IP address/port information allocated for packets of the private IP address to the PCRF.

Next, the PCRF proceeds to step 515 and receives a subscription information response of informing that the subscription information request has been successfully made, from the NAT.

After that, if receiving mapping information from the NAT in step 520, the PCRF proceeds to step 525 and sends the NAT an ACKnowledgement (ACK) of acknowledging that the PCRF has received the mapping information from the NAT. The mapping information represents IP address translation mapping information between a private IP address and a public IP address or a previous port and a translated port. Next, the PCRF proceeds to step 530 and determines which public IP address has been mapped to the private IP address of the UE, based on the mapping information.

After that, if receiving a service information request from an AF in step 535, the PCRF proceeds to step 540 and sends a service information response to the service information request, to the AF. The service information response includes QoS information about the UE and the public IP address of the UE.

Next, the PCRF proceeds to step 570 and identifies the UE corresponding to the public IP address received from the AF, using the IP address translation mapping information received from the NAT, to determine a policy to apply to the identified UE, and generates a PCC rule to send a PCC rule provision request including the PCC rule to an IP-Edge. After that, the PCRF proceeds to step 575 and, in response to the PCC rule provision request, receives a PCC rule provision response representing the completion of resource subscription from the IP-Edge.

On the other hand, if it is not the PUSH mode but a PULL mode in step 505, when receiving a service information request from the AF in step 545, the PCRF proceeds to step 550 and sends the NAT a request for mapping information about the UE which has sent a service request. The mapping information represents the IP address translation mapping information between the private IP address and the public IP address or the previous port and the translated port.

After that, if receiving the mapping information from the NAT in step 555, the PCRF proceeds to step 560 and determines which public IP address has been mapped to the private IP address of the UE, based on the mapping information.

Next, the PCRF proceeds to step 565 and sends a service information response to the service information request, to the AF.

Next, in step 570, the PCRF identifies the UE corresponding to the public IP address received from the AF, using the IP address translation mapping information received from the NAT, to determine a policy to apply to the identified UE, and generates a PCC rule to send a PCC rule provision request including the PCC rule to an IP-Edge. In response to the PCC rule provision request, the PCRF proceeds to step 575 and receives a PCC rule provision response representing the completion of resource subscription from the IP-Edge.

The method described above in relation with FIG. 5 under of the present invention may be provided as one or more instructions in one or more software modules stored in the respective apparatus.

FIG. 6 is a flowchart illustrating an operation process of a NAT according to an exemplary embodiment of the present invention.

Referring to FIG. 6, if it is a PUSH mode in step 610, the NAT proceeds to step 615 and receives a subscription information request from a PCRF. The subscription information request represents that, if an IP address allocated to a UE is a private IP address, the PCRF sends the NAT a subscription request for forwarding public IP address/port information allocated for packets of the private IP address to the PCRF.

Next, the NAT proceeds to step 620 and sends a subscription information response of informing that the subscription information request has been successfully made, to the PCRF.

After that, if detecting that the UE sends a service request to an AF in step 625, the NAT proceeds to step 630 and sends mapping information about the UE, to the PCRF.

The mapping information represents the IP address translation mapping information between the private IP address and the public IP address or the previous port and the translated port.

Next, the NAT proceeds to step 635 and receives, from the PCRF, an acknowledgement of acknowledging that the PCRF has received the mapping information from the NAT.

If it is not the PUSH mode but a PULL mode in step 610, when receiving a mapping information request from the PCRF in step 640, the NAT proceeds to step 645 and transmits mapping information including a private IP address for a public IP address included in the mapping information request, to the PCRF.

The method described above in relation with FIG. 6 under of the present invention may be provided as one or more instructions in one or more software modules stored in the respective apparatus.

FIG. 7 is a block diagram illustrating a construction of a PCRF according to an exemplary embodiment of the present invention.

Referring to FIG. 7, the PCRF includes a MOdulator/DEModulator (MODEM) 710, a controller 720, a storage unit 730, and a service information manager 740.

The modem 710 is a module for communicating with other devices. The modem 710 includes a wired processor, a baseband processor and the like. The wired processor converts a signal received through a wired path into a baseband signal and provides the baseband signal to the baseband processor. The wired processor converts a baseband signal provided from the baseband processor into a wired signal such that it can actually transmit the wired signal on the wired path, and transmits the wired signal through the wired path.

The controller 720 controls general operation of the PCRF. Particularly, the controller 720 can include or control the service information manager 740 according to the present invention.

The storage unit 730 performs a function for storing a program for controlling general operation of the PCRF and temporary data generated during program execution.

If it is a PUSH mode, the service information manager 740 sends a subscription information request to a NAT. The subscription information request represents that, if an IP address allocated to a UE is a private IP address, the PCRF sends the NAT a subscription request for forwarding public IP address/port information allocated for packets of the private IP address to the PCRF.

If receiving mapping information from the NAT, the service information manager 740 sends the NAT an acknowledgement of acknowledging that the PCRF has received the mapping information from the NAT. The mapping information represents IP address translation mapping information between a private IP address and a public IP address or a previous port and a translated port.

The service information manager 740 determines which public IP address has been mapped to the private IP address for the UE, based on the mapping information.

If receiving a service information request from an AF, the service information manager 740 sends a service information response to the service information request, to the AF. The service information response includes QoS information about a UE and a public IP address of the UE.

The service information manager 740 identifies the UE corresponding to the public IP address received from the AF, using the IP address translation mapping information received from the NAT, to determine a policy to apply to the identified UE, and generates a PCC rule to send a PCC rule provision request including the PCC rule to an IP-Edge.

If it is not the PUSH mode but a PULL mode, when receiving the service information request from the AF, the service information manager 740 sends the NAT a request for mapping information for a UE which has sent a service request. The mapping information represents the IP address translation mapping information between the private IP address and the public IP address or the previous port and the translated port.

If receiving the mapping information from the NAT, the service information manager 740 determines which public IP address has been mapped to the private IP address of the UE, based on the mapping information.

The service information manager 740 sends a service information response to the service information request, to the AF.

The service information manager 740 identifies the UE corresponding to the public IP address received from the AF, using the IP address translation mapping information received from the NAT, to determine a policy to apply to the identified UE, and generates a PCC rule to send a PCC rule provision request including the PCC rule to the IP-Edge.

In response to the PCC rule provision request, the service information manager 740 receives a PCC rule provision response representing the completion of resource subscription from the IP-Edge.

FIG. 8 is a block diagram illustrating a construction of a NAT according to an exemplary embodiment of the present invention.

Referring to FIG. 8, the NAT includes a modem 810, a controller 820, a storage unit 830, and a mapping address manager 840.

The modem 810 is a module for communicating with other devices. The modem 810 includes a wired processor, a baseband processor and the like. The wired processor converts a signal received through a wired path into a baseband signal and provides the baseband signal to the baseband processor. The wired processor converts a baseband signal provided from the baseband processor into a wired signal such that it can actually transmit the wired signal on the wired path, and transmits the wired signal through the wired path.

The controller 820 controls general operation of the NAT. Particularly, the controller 820 can include or control the mapping address manager 840 according to the present invention.

The storage unit 830 performs a function for storing a program for controlling general operation of the NAT and temporary data generated during program execution.

If it is a PUSH mode, the mapping address manager 840 receives a subscription information request from a PCRF. The subscription information request represents that, if an IP address allocated to a UE is a private IP address, the PCRF sends the NAT a subscription request for forwarding public IP address/port information allocated for packets of the private IP address to the PCRF.

The mapping address manager 840 sends a subscription information response of informing that the subscription information request has been successfully made, to the PCRF.

If detecting that a UE sends a service request to an AF, the mapping address manager 840 sends mapping information about the UE to the PCRF. The mapping information represents IP address translation mapping information between a private IP address and a public IP address or a previous port and a translated port.

The mapping address manager 840 receives, from the PCRF, an acknowledgement of acknowledging that the PCRF has received the mapping information from the NAT.

If it is not the PUSH mode but a PULL mode, if the mapping address manager 840 receives a mapping information request from the PCRF, the mapping address manager 840 transmits mapping information, which includes a private IP address for a public IP address included in the mapping information request, to the PCRF.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, exemplary embodiments of the present invention have an advantage of, when allocating a private IP address to a UE due to the deficiency of an IPv4 address, being capable of processing, by a NAT, a resource subscription request from a service that uses a public IP address.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. An operation method of a policy decision device in a mobile communication system, the method comprising:
receiving, from a policy enforcement device, a policy and charging control (PCC) rule request for a user equipment that is allocated a private address;
determining a policy to apply to the user equipment transmitting, to the policy enforcement device, a PCC rule response including the determined policy;
transmitting, to an address translation device, a subscription request for a public address of the user equipment corresponding to the allocated private address;
receiving, from the address translation device, a subscription response informing of a success of the subscription request;
receiving, from the address translation device, a message comprising mapping information between the private address and the public address of the user equipment based on the subscription request;
receiving, from an application function, a request regarding a service for the user equipment, the request comprising the public address of the user equipment and quality information of the service;

identifying the user equipment using the public address and the mapping information; and transmitting, to the application function, another response including an acceptance of non-acceptance of the quality information to the request regarding the service for the user equipment.

2. The method of claim 1, further comprising receiving, from the address translation device, other mapping information between a port number of the private address, and a port number of the public address.

3. The method of claim 1, wherein identifying the user equipment using the public address and the mapped address information comprises:

determining the public address, the private address for the user equipment mapped to a port number of the public address, and a port number of the private address; and identifying the user equipment that uses the private address and the port number of the private address.

4. An operation method of an address translation device in a mobile communication system, the method comprising:

receiving, from a policy decision device, a subscription request for a public address of a user equipment corresponding to an allocated private address;

transmitting, to the policy decision device, a subscription response informing of a success of the subscription request;

receiving a service request from the user equipment that is allocated a private address;

in response to receiving the service request, determining mapping information between the private address and the public address of the user equipment;

transmitting the service request to an application function after changing the private address to a mapped public address; and transmitting, to the policy decision device, a message comprising the mapping information based on the subscription request.

5. The method of claim 4, further comprising transmitting, to the policy decision device, other mapping information between a port number of the private address, and a port number of the public address.

6. The method of claim 4, wherein, determining the mapping information comprises determining the public address, the private address for the user equipment mapped to a port number of the public address, and a port number of the private address.

7. A policy decision device in a mobile communication system, the device comprising:

a modulator/demodulator (modem) configured to:

receive, from a policy enforcement device, a policy and charging control (PCC) rule request for a user equipment which is allocated a private address;

determine a policy to apply to the user equipment;

transmit, to the policy enforcement device, a PCC rule response including the determined policy;

transmit, to an address translation device, a subscription request for a public address of the user equipment corresponding to the allocated private address;

receive, from the address translation device, a subscription response informing of a success of the subscription request;

receive, from the address translation device, a message comprising mapping information between the private address and a public address of the user equipment based on the subscription request; and receive, from an application function, a request regarding a service for the user equipment, the request comprising the public address of the user equipment and quality information of the service; and a controller configured to identify the user equipment using the public address and the mapping information, and wherein the modem is further configured to transmit, to the application function, a response including an acceptance of non-acceptance of quality information to the request regarding the service for the user equipment.

8. The device of claim 7, wherein the modem is further configured to receive, from the address translation device, other mapping information between a port number of the private address, and a port number of the public address.

9. The device of claim 7, wherein, when identifying the user equipment using the public address and the mapped address information, the controller is configured to;

determine the public address, the private address for the user equipment mapped to a port number of the public address, and a port number of the private address; and identify the user equipment that uses the private address and the port number of the private address.

10. An address translation device in a mobile communication system, the device comprising:

a modulator/demodulator (modems configured to:

receive, from a policy decision device, a subscription request for a public address of a user equipment corresponding to a private address;

transmit, to the policy decision device, a subscription response informing of a success of the subscription request;

receive a service request from the user equipment that is allocated a private address; and a processor configured to:

in response to receiving the service request, determine mapping information between the private address and a public address of the user equipment, wherein the modem is further configured to:

transmit the service request to an application function after changing the private address to a mapped public address; and transmit, to the policy decision device, a message comprising the mapping information based on the subscription request.

11. The device of claim 10, wherein the processor is configured to determine the public address, the private address for the user equipment to be mapped to a port number of the public address, and a port number of the private address.

12. The device of claim 10, wherein the modem is configured to transmit, to policy decision device, other mapping information between a port number of the private address, and a port number of the public address.

* * * * *